(12) United States Patent
Weber et al.

(10) Patent No.: US 7,921,447 B1
(45) Date of Patent: Apr. 5, 2011

(54) ENHANCED TELEVISION METADATA PROCESSOR FOR EFFICIENT BROADCAST OPERATIONS

(75) Inventors: Jay Weber, Menlo Park, CA (US);
David Kaiser, Hillsborough, CA (US);
Prasad Panchangam, Sunnyvale, CA (US)

(73) Assignee: Thomson Licensing,
Boulogne-Billancourt (FR)

( * ) Notice: Subject to any disclaimer, the term of this patent is extended or adjusted under 35 U.S.C. 154(b) by 2139 days.

(21) Appl. No.: 10/390,146

(22) Filed: Mar. 14, 2003

(51) Int. Cl.
*H04N 7/173* (2006.01)

(52) U.S. Cl. ............ 725/95; 725/51; 725/104; 725/131; 725/136; 370/230; 370/230.1; 370/235

(58) Field of Classification Search .................. 370/230, 370/230.1, 235
See application file for complete search history.

(56) References Cited

U.S. PATENT DOCUMENTS

| | | | | |
|---|---|---|---|---|
| 5,608,446 | A * | 3/1997 | Carr et al. ...................... | 725/114 |
| 6,477,504 | B1 | 11/2002 | Hamlin et al. | |
| 6,810,528 | B1 | 10/2004 | Chatani | |
| 7,047,316 | B2 * | 5/2006 | Iwata et al. ................... | 709/240 |
| 2002/0007303 | A1 | 1/2002 | Brookler et al. | |
| 2002/0133405 | A1 * | 9/2002 | Newnam et al. ................ | 705/14 |
| 2003/0009587 | A1 * | 1/2003 | Harrow et al. ................ | 709/238 |
| 2003/0172374 | A1 * | 9/2003 | Vinson et al. ..................... | 725/9 |
| 2004/0261130 | A1 * | 12/2004 | Leak et al. ..................... | 725/136 |
| 2006/0212921 | A1 * | 9/2006 | Carr ............................... | 725/136 |

FOREIGN PATENT DOCUMENTS

WO    WO01/22261 A2    3/2001

OTHER PUBLICATIONS

Liberate Technologies—Solutions, Liberate TriggerFilter, 1 page, Mar. 13, 2003, http://solutions.liberate.com/prodcts/trigger_filter.html.
Liberate Technologies—Solutions, Liberate TriggerHub, 1 page, Mar. 13, 2003, http://solutions.kiberate.com/products/trigger_hub.html.
Liberate Technologies—Solutions, Liberate mediacast Server, 2 pages, Mar. 13, 2003, http://solutions.liberate.com/products/mediacast_server.html.

* cited by examiner

*Primary Examiner* — John W Miller
*Assistant Examiner* — Omar Parra
(74) *Attorney, Agent, or Firm* — Robert D. Shedd; Vincent E. Duffy; Joel M. Fogelson (57) ABSTRACT

A method and apparatus for enhanced video signal processing are described. An enhanced video signal is received. A plurality of metadata describing the enhanced video signal are generated and processed. A channel for transmission of the enhanced video signal to a plurality of viewers is determined.

23 Claims, 5 Drawing Sheets

| FileID | Maximum size | Preloadable? |
|---|---|---|
| ... | | |

FIG. 5

| FileID | P(FileID\|Session) | Minimum Delay |
|---|---|---|
| ... | | |

FIG. 6

| N/R | F/B | Start | Duration | Amount |
|---|---|---|---|---|
| ... | | | | |

FIG. 7

ENHANCED TELEVISION METADATA PROCESSOR FOR EFFICIENT BROADCAST OPERATIONS

FIELD OF THE INVENTION

The present invention pertains to enhanced television technology. More particularly, the present invention relates to improving broadcast operations by utilizing metadata in enhanced television.

BACKGROUND OF THE INVENTION

With technological developments of today's world, our lives become more enhanced. One of such life enhancement is Enhanced Television, which allows viewers to obtain more information on a particular item displayed on the TV screen, purchase a particular item displayed on the TV screen, etc. For example, during an aired pizza commercial, the viewer may be presented with an opportunity to order pizza by clicking on a particular icon displayed on the screen during the commercial. Thus, Enhanced Television, or ETV, is the combination of broadcast programming and synchronized interactive graphics, text, and forms. Hence, as ETV is a synchronization of programming and interactivity, it requires technical integration of broadcast signal and the interactive capabilities of distribution and in-home equipment, in particular between programmers and operations.

It is usually assumed that a programmer does all the preparation of the signal and an operator serves as a pass-through, perhaps with signal format conversion. However, this method is not very efficient. First, operators are deploying a variety of set-top boxes that have a diverse set of capabilities and a combination of standardizes and proprietary interfaces. Programmers, who generally strive for maximum distribution, cannot prepare the interactive signal components in one way that fits all. Second, distribution plans have varying requirements and capabilities in forward-channel and back-channel bandwidth and latencies. A basic choice is whether to embed content in the broadcast signal or send a trigger to load the content over a back-channel; the optimum choice varies by operators and over time even for a single operator.

Thus, what is needed is a system and method to overcome these and other shortcomings of the prior art.

SUMMARY OF THE INVENTION

A method and apparatus for enhanced video signal operations are disclosed. A method includes receiving an enhanced video signal and generating a plurality of metadata describing the enhanced video signal. The method also includes processing the plurality of metadata and determining which channel to utilize for transmission of the enhanced video to a plurality of viewers.

BRIEF DESCRIPTION OF THE DRAWINGS

The present invention is illustrated by way of example and not limitation in the figures of the accompanying drawings, in which like references indicate similar elements and in which.

DETAILED DESCRIPTION

An enhanced broadcast processor is described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

It will be appreciated that the term "programmer", as used herein, means a group of individuals producing broadcast streams which are picked up by operators. It will also be appreciated that the term "operators", as used herein, means a group of individuals sending the picked up stream over their network's forward channel to set-top boxes used by viewers to watch TV. In addition, it will be appreciated that the term "forward-channel", as used herein, means a 1-way communications link from the content provider, such as a television network, to a TV viewer, something we all experience by just watching TV. The term "back-channel", as used herein, means a 2-way communications link between the TV viewer and the interactive content provider, which is usually of a lower bandwidth that the forward-channel.

Exemplary Architecture

Figure 1:
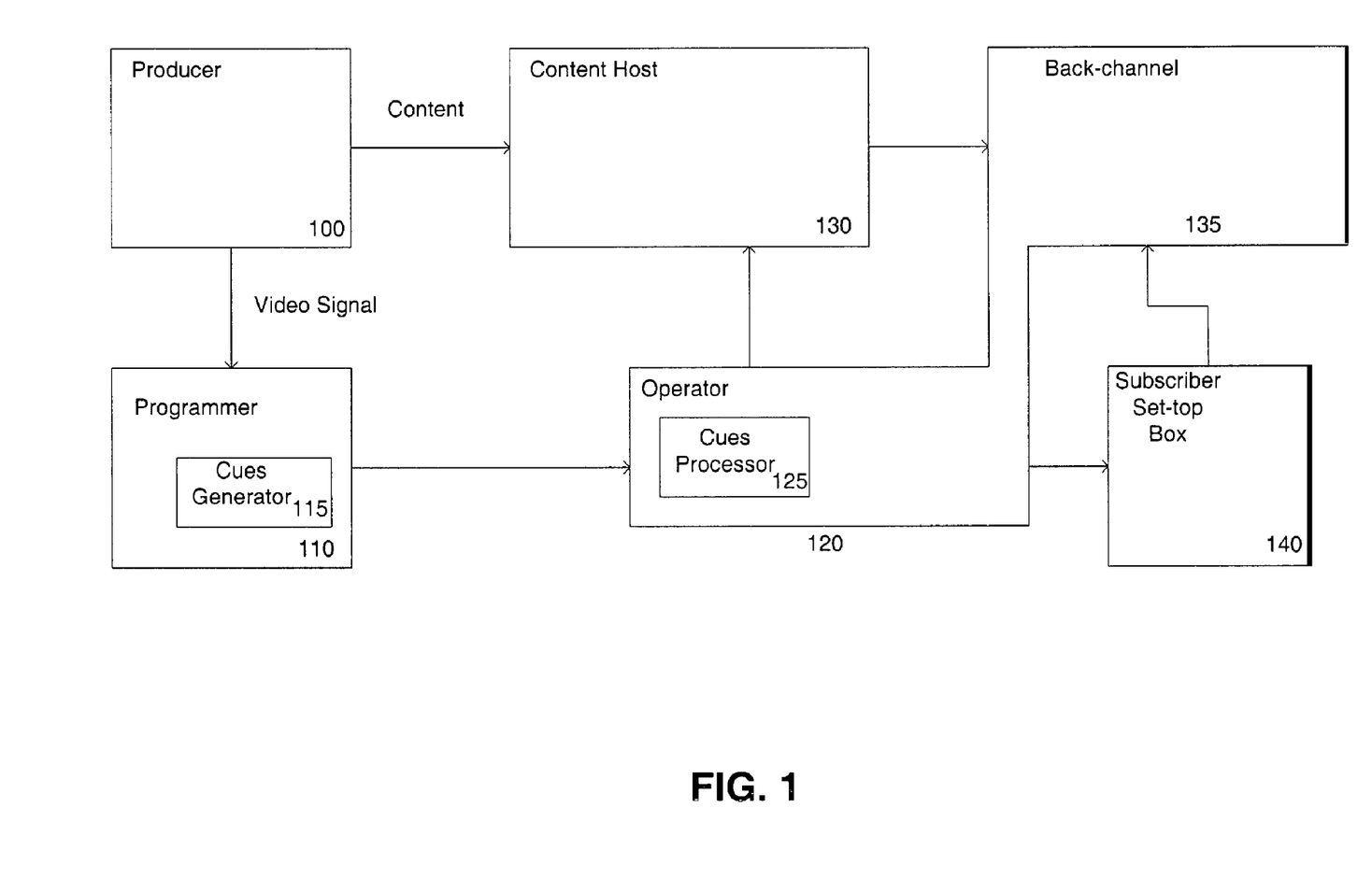
FIG. 1 illustrates a system architecture according to one embodiment of the invention.

FIG. 1 illustrates a simplified broadcast chain and back-channel and the entities that constitute them according to one embodiment of the present invention. A producer 100 provides the video signal to a programmer 110, which includes cues generator 115 that provides the video signal along with the cues to an operator 120, which includes cues processor 125 for processing cues. The ETV content is provided directly to a content host 130 by the producer 100. The content host 130 serves as a clearinghouse for multi-platform content and a server both for the operator 120 to load and cache content to be pushed over broadcast, and for a set-top back-channel 135 to pull, personalize and transmit transaction data over back-channels, which are usually provided by the operators. The video signal along with the enhanced television data is then provided to a set-top box of the subscriber 140.

Figure 2:
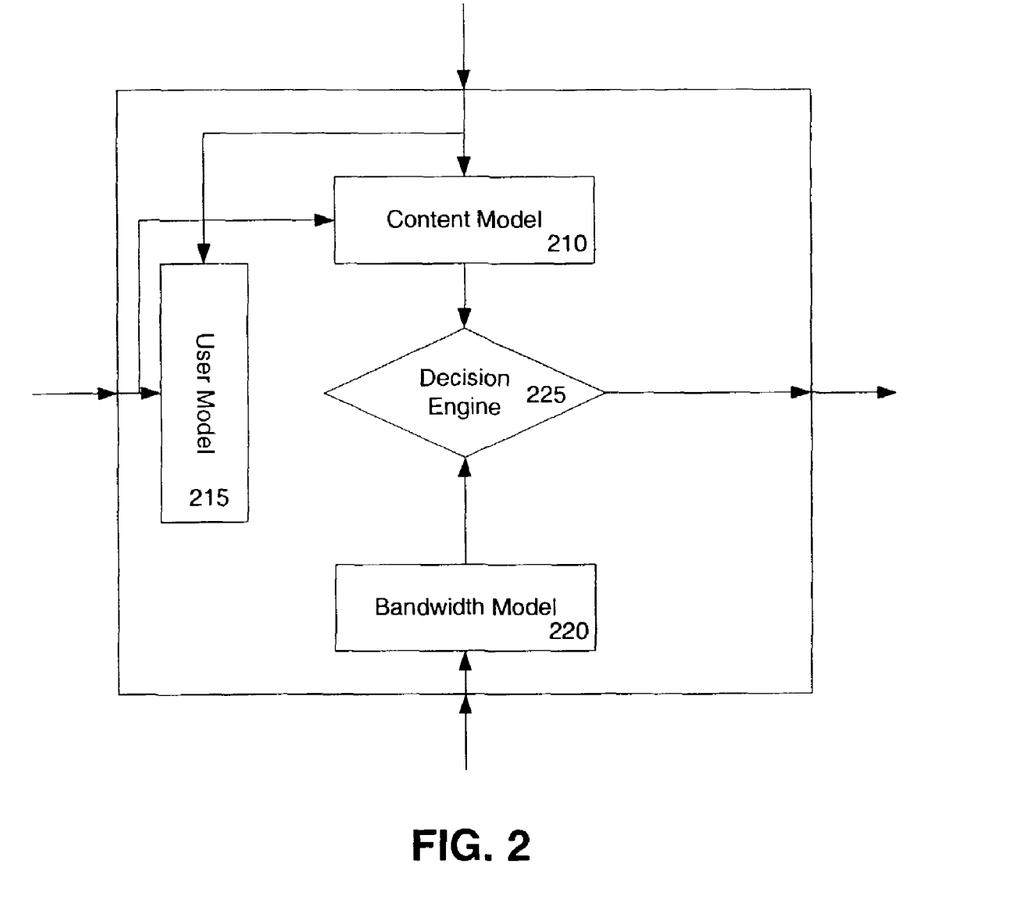
FIG. 2 illustrates components of a cue processor according to one embodiment of the invention.

FIG. 2 illustrates components of the cue processor 125 according to one embodiment of the present invention. As illustrated cue processor 125 includes content model 210, a user model 215 and the bandwidth model 220. The cue processor also includes a decision engine 225. Functions of these components are described in detail below.

Methodology

The invention is further described with reference to FIG. 3, which illustrates a process of ETV session according to one embodiment of the invention. At 300, the producer transmits the video signal to the programmer and at 310 the producer transmits the ETV data to the content host. Upon receipt of the video signal, the programmer generates a set of cues to be embedded in the broadcast signal transmitted to the operator.

In one embodiment, the cues may be transmitted using the following general formula:

!!<URI>{[attr1:value1][attr2:value2] ... [attrN:valueN]} {[checksum]}

The prefix "!!" indicates the following characters represent a cue. The operators may choose to act on the cue or discard it. The remainder of the cue is designed to follow the syntax of triggers from Electronic Industry Alliance (EIA)-608B standard, which is well known in the art, however, it will be appreciated that the cues do not need to follow this syntax and other syntax may be utilized. The prefix "!!" may be utilized to distinguish programmer cues from actual EIA-608B triggers to ensure correct interpretation of the data.

The URI identifies the enhancement resource. The URI is enclosed in an angled brackets, followed by zero or more pairs of attributes and values in square brackets, followed by an optional checksum in square brackets. In one embodiment the order of the attributes is not important.

In one embodiment, the characters included in the cues are interpreted as International Standards Organization (ISO)-8859-1 (Latin-1) standard characters which are well known in the art. Only those with the range 20h to 7Eh are used, the remaining characters may be discarded when processing cues. Some URIs, attributes or values may require characters not within this range. These characters may be encoded using the standard mechanism of "%" followed by the two-digit hexadecimal value as described in 150-8859-1.

The URI identifies a generic enhancement resource that is to be acted upon. An enhancement resource may be a single item such as a trigger, or a content package, carousel file, schedule; or it may be a group of several such components. The schedule refers to a set of enhancements and their timings throughout a television show or spot. A single cue is able to start the schedule, and the operator sends the enhancement components for the show as dictated in the schedule. The URIs may be specified as relative or absolute. Although relative URIs do not include identification of a server, a predefined server at which the information referenced by a relative URI is located, may provided to operators by programmers. An enhancement service provider may provide a web interface for obtaining the data. The detailed description of this method is presented below.

In one embodiment a variety of attribute fields may be utilized such as component, action, duration, offset, id, expires, source, utc, response, etc. The component attributes may be used when the URI references a resource group; the value specifies a component within the group. The URI itself could contain component name, for example, the following cues identify the same resource:

!!<adsponsor/enh01>[component:content01]
!!<adsponsor/enh01/content01>

Keeping the URI as the root of the group (in this case, adsponsor/eng01) enables operators to group cues that apply to the same enhancement.

The action attribute specifies how the resource is to be processed. The following table includes an example of some of the actions:

| Action Value | Action to take |
| --- | --- |
| Start | Start the enhancement |
| Stop | Stop the enhancement. If the URI specifies a group, stop all its components |
| Pause | Pause the enhancement and freeze the duration countdown. If the URI specifies a group, pause all its components |

-continued

| Action Value | Action to take |
| --- | --- |
| Resume | Resume the enhancement after a pause |
| Load | Pre-load the enhancement |
| Cancel | Cancel all previous matching cues. See "id" attribute for details |
| Query | 2-way protocol: Ask for the status of the enhancement |
| Response | 2-way protocol: Reply to a status request |

If an action is not specified, the default action is start.

The duration attribute is used with the start action. It specifies how long, in milliseconds, for example, the enhancement should run for. A value of zero indicates the enhancement should run only once. If no duration is specified, the enhancement is run until a stop action is called.

The offset attribute specifies when the action should be executed. In one embodiment if a utc value is specified, the offset is relative to this time, otherwise the offset is relative to the time when the cue was received. If no offset is specified, an offset of zero may be used. Units may be specified in milliseconds.

The id attribute together with the URI and component attribute uniquely identify a cue. If a cue is sent multiple times, and these fields remain the same, the previous cues can be discarded. For example, a cue with an offset of 30 seconds is sent every 10 seconds, with the offset value decreasing accordingly. The id will be the same each time, so the cue can be processed only ones. Multiple cues may enable systems to cope with occasional delivery failures.

When a cancel action is processed, the results depend on whether the three identification fields are specified. If just the URI is specified, all cues with the same URI are cancelled. If the URI and component are specified, all cues matching both fields are cancelled. If the id is also specified, only those cues matching all three fields are cancelled.

The expires attribute specifies in UTC when the cue is no longer valid. Expired cues can be discarded.

The source attribute specifies who sent the cue, usually the programmer, but it may also specify an operator replying to a query in a 2-way protocol, as described below.

The utc attribute is a UTC timestamp for the cue. The offset attribute is relative to this attribute.

The response attribute is part of the 2-way protocol and contains the response message requested by a query action. If this attribute is present, the action attribute is the response and so is ignored.

The checksum may be included to detect data corruption. It can be identical to the Internet Protocol checksum described in IETF RFC 791 standard and IETF RFC 1071 standard, also used in EIA-608B standard. The "!!" can be included in the calculation. The result of the checksum calculation is a 16-bit value transmitted as four hexadecimal digits, with the most significant byte first. Characters outside the range of 20h to 7Eh are not included in the checksum.

Cue transmission mechanisms may have bandwidth constraints. In order to adhere to these constraints, abbreviations for attributes may be utilized. For example, an abbreviation for [component:xxx] may be [c:xxx]. Variety of abbreviations may be utilized in the invention and the present invention is not limited to any particular abbreviations of the attributes.

Figure 3:
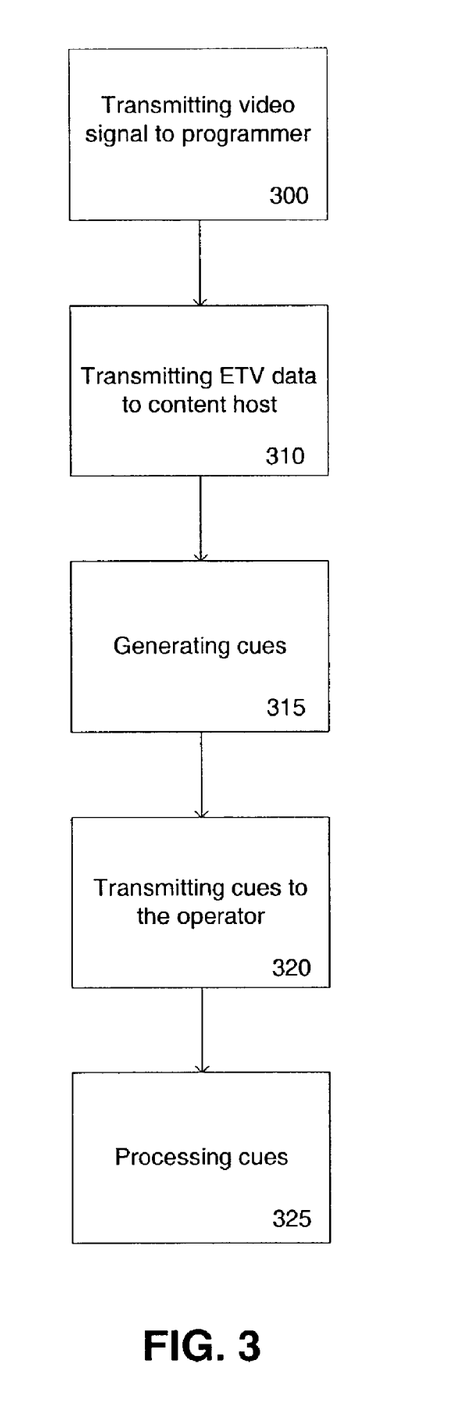
FIG. 3 is a flow chart of cue processing according to one embodiment of the invention.

Upon generation of the cues, the programmer transmits cues to the operator at 320 of FIG. 3. The delivery of cues may take place in the T-2 service of a video broadcast, conforming to EIA-608 standard (Recommended Practice for Line 21 Data Services; or it may delivered as an out of band via TCP/IP or UDP/IP. The cues do not interfere, and may be used in conjunction, with triggers as described in EIA-608B.

With one-way protocol, cues are delivered in-band. In-band cues are synchronized to the broadcast, so that time offsets are relative to the point in the broadcast when the cue is received.

An out-of-band delivery of cues may utilize the 2-way protocol that includes query and response actions. A programmer may send a query action cue asking for the status of an enhancement. The enhancement is identified by the URI, and optionally by the component attribute. The operator may reply with a response action cue, containing the status of the enhancement in the response attribute. The format of the response value may be defined by the programmer and operator involved. A query action cue containing an id attribute is a request for the status of a cue. The id, URI and component are used to match the cue. The operator replies with a response action cue containing the status of the cue in the response attribute.

As mentioned above, a UTC time stamp can be included in cues that are not synchronized to the broadcast. If possible, this timestamp should take into account the time difference between the video feed at the programmer, and the video feed received by the operator. Alternatively, the operator can use the source field to identify the programmer, and adjust the timestamp accordingly.

In one embodiment of the invention, a schedule resource specifies a set of enhancement resources with a schedule of when each resource should be processed. The timings will be relative to a point in time, which may be the beginning of a television show or spot. A schedule is specified as a list of cues described above. The original cue that references the schedule resource determines source and utc attributes. Original cue's offset value is added to the offset value in each schedule cue.

As specified above, the producer transmits the ETV data to the content host. By providing a standard interface, the content host service providers are able to serve content for multiple operator platforms from a single source. In one embodiment the interface may have the following format ContentHostURL/EnhancementURl/Component,
where Component can be options. For example, http://itv.contenthost.com/spi/adsponsor/enh01/content01

The SPI format allows the operator to select the content host when the enhancement URI is relative, and also allows the programmer to specify the content host with an absolute enhancement URI.

The following table lists parameters that may be included in the request:

| Parameter | Value |
| --- | --- |
| Source | Programmer; same value as cue source attribute |
| Client | Operator |
| Platform | Standardized name of the enhanced television platform |
| Device | Standardized name of the insertion system |
| Any other platform or insertion specific parameters | |

The content host attempts to return data that matches the device. If the device is not recognized, the platform should be used to locate the data. If the platform is not supported or recognized, the request may be rejected.

In one embodiment the content host is able to choose resource based on the programmer and operator, allowing regional targeting of enhancements. If an enhancement is not available for a platform, the content host has an option of returning a default enhancement.

Figure 4:
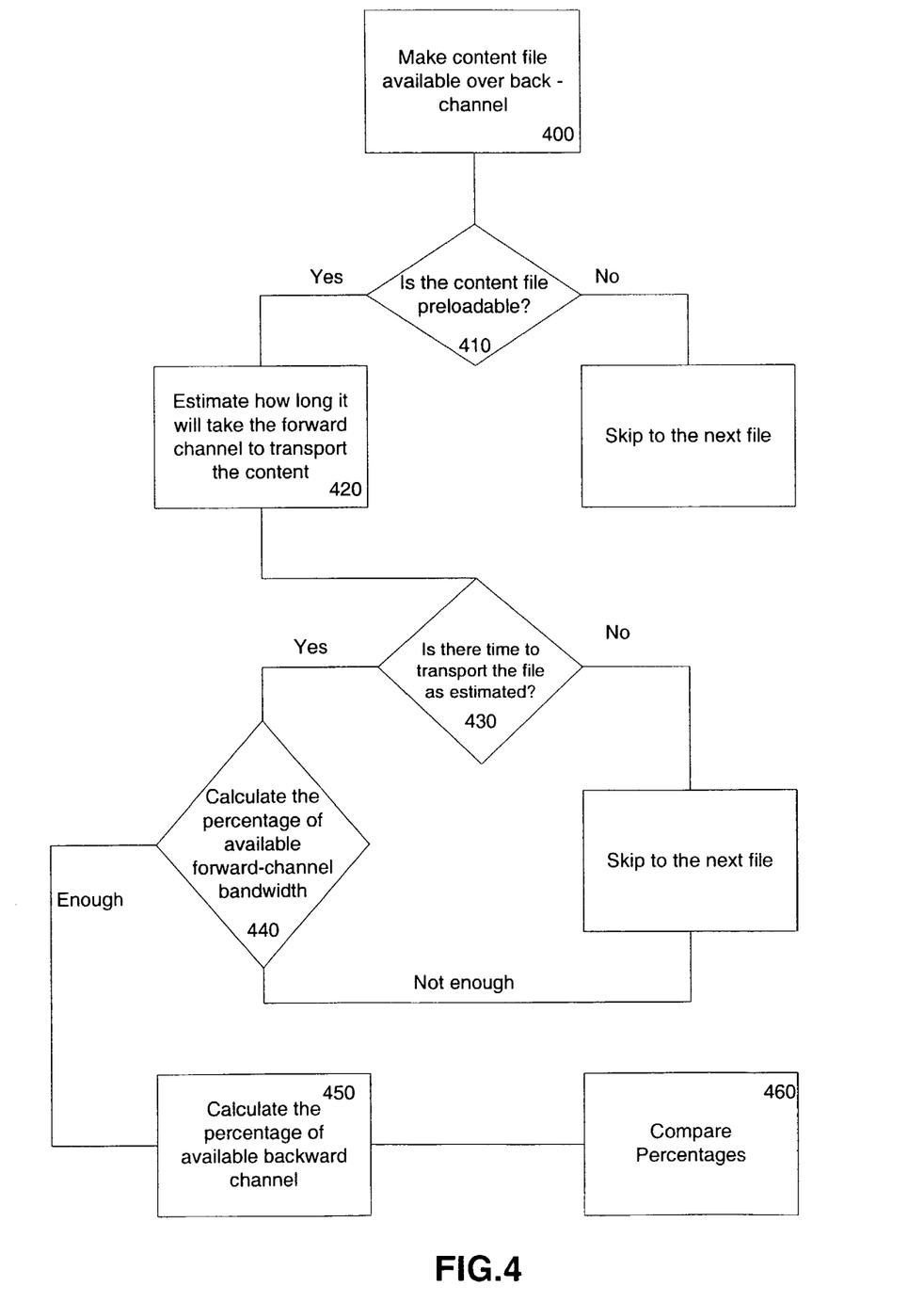
FIG. 4 is a flow chart of transmission channel selection process according to on embodiment of the invention.

Upon receipt of the cues, the cues processor at the operator processes the cues. The cues processing is described with reference to FIG. 4. The decision engine consults content, user and bandwidth models to determine whether each content file should be sent in the forward-channel or over the back-channel. In one embodiment, it is prudent to make the content available over the back-channel anyway in case there is a problem with transporting the file over the forward-channel. Upon receipt of the cues, the decision engine makes the content files available for transmission over channels by contacting the content host when necessary.

Figure 5:
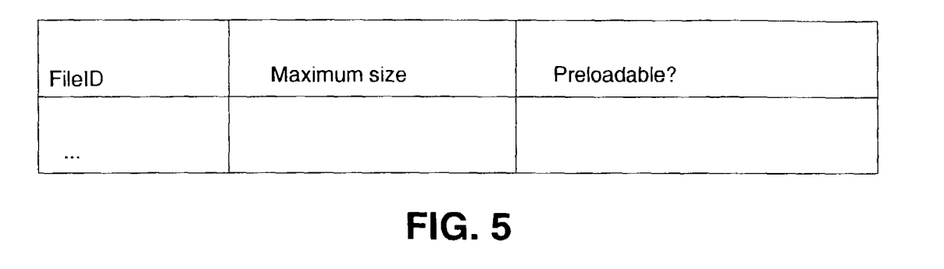
FIG. 5 illustrates a content table according to one embodiment of the invention.

In one embodiment the content model 200 builds an understanding of the characteristics of the content needed for a particular ETV session. As stated above, the content may include several files, such as HTML files and embedded graphics in GIF and/or JPEG formats, OpenTV compiled O-code and resource files, and the like. The content model includes a content table, illustrated in FIG. 5, in order to provide the decision engine with necessary information for providing the enhanced content to the viewers. The content model requests information such as file ID, maximum size of the file, a flag indicating whether the file is pre-loadable from the content host to be filled in the content table. In one embodiment, files that are dynamic and need to be generated at view time are identified by the pre-load flag being false. The content model obtains the table contents from the hosting service based on the content reference given in the broadcast metadata and an identifier of the specific platform needed for the operator's set-tops. For example, if the broadcast metadata contains the URL http://etv.respondtv.com/buypizza then "buypizza", which is the content reference, and a platform identifier is "liberate DTV2", the content model can connect to the content host and request a content model for buypizza/liberateDTV2/model.xml.

The user model assists the decision engine in providing the enhanced content to the viewers by compiling the likelihood information that each content file will actually be viewed and therefore should be at a set-top box. In one embodiment, because of bandwidth differences between the forward-channel and the back-channel, popular content may be provided over the forward-channel and less popular content may be provided over the back-channel. User model includes a table of conditional probabilities illustrated in FIG. 6 according to one embodiment of the invention. The probabilities may be conditioned on the context of a session, i.e., if a viewer enters an ETV session what is the probability that he/she will end up requesting a particular content file. The condition exists because there is often no guarantee that a viewer will enter into an ETV session, for example, Microsoft Television (MSTV) set-top boxes prompt the user for whether to start the ETV session or not. In one embodiment, the conditional probabilities are provided by the hosting service based on statistical information acquired during prior user testing, or estimated based on the structure of the content, for example, by building a tree structure that captures the hyperlinks among the files and generating conditional probabilities based on the link-depth of files in the tree.

Figure 6:
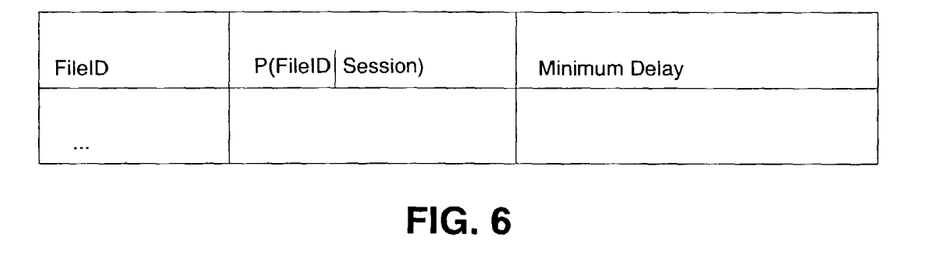
FIG. 6 illustrates a conditional probabilities table according to one embodiment of the invention.

In one embodiment of the invention, the absolute probability of a random set-top box requiring a particular content file is:

$$P(\text{File-instance}|\text{Session-instance})*P(\text{Session-instance}|\text{Viewing-instance})*P(\text{Viewing-instance}),$$

wherein the first operand is from the user model table, the second operand captures how likely a viewer is to start the session, which may be 1 if the content automatically is displayed, less if there is a confirmation step, and the third operand is the likelihood that the set-top box will be tuned to the channel/program in question, i.e., the channel's viewer share expressed as a probability. The latter value may be sent by the programming network in the broadcast signal, or maintained in a database at the operator.

It will be appreciated that calculating probabilities as described above is not the only method that may be used to determine whether particular content should be transmitted over a forward channel. Information in the user table and bandwidth table may be utilized to determine whether the content can be transmitted over the forward channel, as described below.

The user table illustrated in FIG. 6 includes a minimum delay field, which captures how far into the ETV session a user may be before a particular content file is needed, for example, the "thanks for your pizza order" screen is only accessible after deciding to order the pizza, choosing the toppings and entering delivery/payment information, which takes some time and thus introduces a delay into the "thanks for your pizza order" content display. In one embodiment, the minimum delay value are supplied by the content host based on prior user testing or estimated using the link-depth structure of the content.

Figure 7:
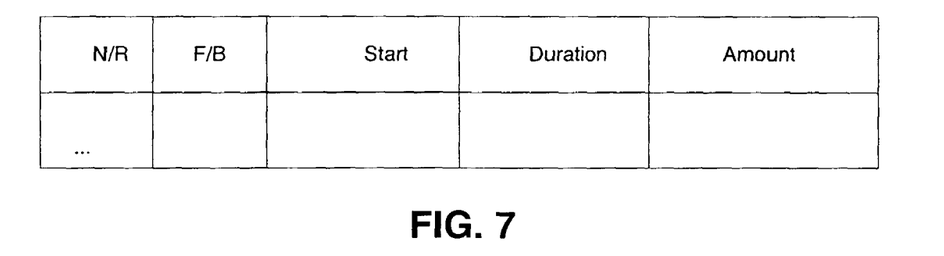
FIG. 7 illustrates a bandwidth table according to one embodiment of the invention.

The bandwidth model assists the decision engine by providing bandwidth information of forward-channel and back-channel. FIG. 7 illustrates a bandwidth table according to one embodiment of the invention. An N/R field encodes whether the entry is a need or a resource, wherein the need specifies an existing allocation and the resource specifies bandwidth the network provides. Resource entries may be provided by the network. The F/B field encodes whether the entry is for forward-channel or back-channel bandwidth. The start and duration fields capture when the bandwidth is available or allocated, and the amount specifies the bandwidth, for example, bytes/sec or equivalent.

Upon making the content available over the back-channel, the decision engine determines whether the file can be transmitted over the forward channel. At 410 of FIG. 4 the decision engine determines whether the content file is preloadable by examining the content table. If the file is preloadable, the decision engine preloads the content file to the content host cache for possible transmission over the forward channel. Upon preloading, the decision engine determines which channel to utilize for transmission of the content based on cost/benefit analysis described below. At 420 the decision engine estimates how long it would take the forward channel to transport the content file based on the maximum size of the file, the remaining time till the ETV session is triggered, as may be expressed by the broadcast metadata), and the minimum delay retrieved from the user table. At 430 the decision engine determines whether the amount of forward-channel bandwidth as specified in the bandwidth table allows the transport of the content file in the amount of time calculated in the previous step. At 440 the decision engine calculates the percentage of available forward-channel bandwidth necessary for the transport of the content file. At 450 the decision engine calculates the percentage of back-channel bandwidth expected for this content file, using the product of the probability of needing the file (P(file-instance)) calculated using the conditional probabilities, and the number of households with back-channel capability. If the percentage of available forward-channel bandwidth necessary for transport of the file is less that the percentage of the available back-channel bandwidth then the decision engine transmits the content file via the forward-channel and updates the bandwidth table accordingly.

In one embodiment of the invention, if the forward-channel and back-channel are nearly full, then the decision engine may revoke reservations of bandwidth and reallocate the resources in order to service content delivery or make it more efficient. The revocation is performed before the content delivery resources are used.

In another embodiment the content that is preloadable may be stored in the set-top boxes cache. Due to the fact that caches of set-top boxes are limited, a bandwidth table similar to the one for the forward-channel bandwidth may be generated for the set-top box cache.

In one embodiment the operator supports multiple platforms and in this case the decision engine determines channels over which the content will be transported for every subnetwork of set-top boxes.

It will be recognized that many of the features and techniques described above may be implemented in software. For example, the described operations may be carried out in a processing system or other suitable device in response to its processor(s) executing sequences of instructions contained in memory of the device. The instructions may be executed from a memory such as RAM and may be loaded from a persistent store, such as a mass storage device, and/or from one or more other remote processing systems. Likewise, hardwired circuitry may be used in place of software, or in combination with software, to implement the features descried herein. Thus, the present invention is not limited to any specific combination of hardware circuitry and software, nor to any particular source of software executed by the processing systems.

Thus, a method and apparatus for improving broadcast operations by utilizing metadata in enhanced television have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method comprising:
   receiving an enhanced video signal;
   generating a plurality of metadata describing the enhanced video signal;
   processing the plurality of metadata; and
   determining which channel to utilize for transmission of the enhanced video signal to a plurality of viewers
   calculating percentage of available forward-channel bandwidth necessary for transportation of the content file;
   calculating percentage of back-channel bandwidth necessary for transportation of the content file; and
   transmitting the content file over the forward-channel if the percentage of the available forward-channel bandwidth necessary for transportation file is less than the percentage of the available back-channel bandwidth necessary to transmit said enhanced video signal over said back-channel.

2. The method of claim 1 wherein the metadata comprises cues.

3. The method of claim 1 wherein the plurality of metadata identify content to be integrated into the enhanced video signal.

4. The method of claim 2 wherein a format of a cue of the plurality of the cues is !<URL>{[attr1:value1][attr2:value2] . . . [attrN:valueN]}{[checksum]}.

5. The method of claim 1 wherein the determining which channel to utilize for transmission is based on cost/benefit analysis.

6. The method of claim 1 further comprising:
estimating a transportation time necessary for transportation of an enhanced content file;
determining whether forward-channel bandwidth allows transportation of the content file in an amount of the transportation time.

7. The method of claim 1 further comprising determining probability of a set-top box requiring transmission of the content file.

8. The method of claim 7 further comprising determining whether the content file is to be preloaded to the set-top box based on the probability.

9. A method comprising:
receiving a plurality of cues describing an enhanced content of an enhanced video signal;
processing the plurality of cues based on a platform of set-top box out of a plurality of platforms of set-top boxes provided by an operator;
transmitting the enhanced video signal over a channel out of a set of channels, wherein the transmission channel is determined based on a determining a percentage of available forward-channel bandwidth necessary for transportation of the enhanced video signal;
determining a percentage of back-channel bandwidth necessary for transportation of the enhanced video signal; and
transmitting the enhanced video signal over the forward-channel if a percentage of available forward-channel bandwidth necessary for transportation is less than a percentage of the available back-channel bandwidth necessary to transmit said enhanced video signal over said back-channel.

10. The method of claim 9 wherein the set of calculations is based on cost/benefits analysis.

11. An apparatus comprising:
a cues generator for generating a plurality of cues describing enhanced content of an enhanced video signal;
a content host for storing the enhanced content; and
a cues processor for processing the plurality of cues describing the enhanced content and for accessing the stored enhanced content via a content host interface, the cues processor calculating a percentage of available forward-channel bandwidth necessary for transportation of the enhanced content, calculating a percentage of available back-channel bandwidth necessary for transportation of the enhanced content, and transmitting the enhanced content to a plurality of video signal receivers over the forward-channel if the percentage of the available forward-channel bandwidth necessary for transportation of the enhanced content is less than the percentage of the available back-channel bandwidth necessary for transportation of the enhanced content.

12. The apparatus of claim 11 wherein the content host further provided the enhanced content in a specified set-top platform.

13. The apparatus of claim 11 wherein the cues processor includes a content model.

14. The apparatus of claim 11 wherein the cues processor includes a user model.

15. The apparatus of claim 11 wherein the cues processor includes a bandwidth model.

16. The apparatus of claim 13 wherein the content model generates a content table including information about the enhanced content model.

17. The apparatus of claim 14 wherein the user model includes information about a set-top box requiring the enhanced content.

18. The apparatus of claim 17 wherein the information includes probability of the set-top box requiring the enhanced content.

19. A processing system comprising:
a processor; and
a storage medium having stored therein instructions which, when executed by the processor, cause the processing system to perform a process comprising:
receiving an enhanced video signal;
generating a plurality of metadata describing the enhanced video signal;
processing the plurality of metadata; and
determining which channel to utilize for transmission of the enhanced video signal to a plurality of viewers;
calculating percentage of available forward-channel bandwidth necessary for transportation of the content file;
calculating percentage of back-channel bandwidth necessary for transportation of the content file; and
transmitting the content file over the forward-channel if the percentage of the available forward-channel bandwidth necessary for transportation of the content file is less than the percentage of the available back-channel bandwidth.

20. The processing system of claim 19 wherein the plurality of metadata identify content to be integrated into the enhanced video signal.

21. The processing system of claim 19 wherein the determining which channel to utilize for transmission is based on cost/benefit analysis.

22. A processing system comprising:
a processor; and
a storage medium having stored therein instructions which, when executed by a processor, cause the processing system to perform a process comprising:
receiving a plurality of cues describing an enhanced content of an enhanced video signal;
processing the plurality of cues based on a platform of a set-top box out of a plurality of platforms of set-top boxes provided by an operator; and
transmitting the enhanced video signal over a channel out of a set of channels, the transmission channel is determined based on a set of calculations, wherein the set of calculations includes transmitting the enhanced video signal over the forward-channel if the percentage of available forward-channel bandwidth necessary for transportation of the content file is less than the percentage of available back-channel bandwidth necessary to transmit said enhanced video signal over said back-channel.

23. The processing system of claim 22 wherein the set of calculations is based on cost/benefits analysis.

* * * * *